(12) United States Patent
Inoue

(10) Patent No.: US 8,825,771 B2
(45) Date of Patent: Sep. 2, 2014

(54) SYSTEM FOR NOTIFYING MAIL-RECEIVING ERROR INFORMATION

(75) Inventor: Makoto Inoue, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 717 days.

(21) Appl. No.: 12/716,012

(22) Filed: Mar. 2, 2010

(65) Prior Publication Data

US 2010/0235435 A1    Sep. 16, 2010

(30) Foreign Application Priority Data

Mar. 12, 2009 (JP) .................................. 2009-059579

(51) Int. Cl.
- G06F 15/16 (2006.01)
- H04L 12/58 (2006.01)
- G06Q 10/10 (2012.01)

(52) U.S. Cl.
CPC .............. G06Q 10/107 (2013.01); H04L 51/24 (2013.01); H04L 51/22 (2013.01)
USPC .......................................... 709/206; 709/205

(58) Field of Classification Search
USPC ................................................. 709/203–206
See application file for complete search history.

(56) References Cited

U.S. PATENT DOCUMENTS

| | | | |
|---|---|---|---|
| 6,535,910 B1 | 3/2003 | Suzuki et al. | |
| 7,966,372 B1 * | 6/2011 | Tomkow | 709/206 |
| 8,230,022 B2 * | 7/2012 | Sugawara et al. | 709/206 |
| 8,239,458 B2 * | 8/2012 | Agarwal et al. | 709/206 |
| 2003/0056094 A1 * | 3/2003 | Huitema et al. | 713/157 |
| 2004/0105121 A1 * | 6/2004 | Taniguchi et al. | 358/1.15 |
| 2005/0193065 A1 | 9/2005 | Sugimoto et al. | |
| 2009/0313342 A1 * | 12/2009 | Thie | 709/206 |

FOREIGN PATENT DOCUMENTS

| | | | |
|---|---|---|---|
| JP | 02-213252 | 8/1990 | .............. H04L 12/54 |
| JP | 6097962 A | 4/1994 | |
| JP | 10084381 A | 3/1998 | |
| JP | 2001-154946 | 6/2001 | .............. G06F 13/00 |
| JP | 2001282685 A | 10/2001 | |
| JP | 2001326691 A | 11/2001 | |
| JP | 2004118557 A | 4/2004 | |

OTHER PUBLICATIONS

Japanese Office Action dated Jan. 29, 2013 in counterpart Japanese Application No. JP2009-059579.

* cited by examiner

*Primary Examiner* — David Lazaro
*Assistant Examiner* — Marie Georges Henry
(74) *Attorney, Agent, or Firm* — Fitzpatrick, Cella, Harper & Scinto

(57) ABSTRACT

In a case where mail can not be stored in a mail box in a mail receiving server due to capacity excess, a detail content of the mail can be notified to an addressee of the mail. A mail receiving server comprises a mail receiving unit, a first mail box, a determining unit, a temporal storage space, an extracting unit, an information notice mail managing unit, and a second mail box.

15 Claims, 13 Drawing Sheets

1001 — Return-Path: xxxxxxxx@yyyyyyy.ne.jp
Received: from yyyyyyy.ne.jp (yyyyyyyy.ne.jp [xxx.xxx.xxx.xxx])
by smtp.yyyyy.ne.jp (Postfix)
with ESMTP id CA465B2C3;
Mon, 22 Sep 2008 09:25:45 +0900 (JST)
Received:
by yyyyyyy.ne.jp (Postfix) id 1205A1DC003;
Mon, 22 Sep 2008 09:25:47 +0900 (JST)
Delivered-To: zzzzzzz@yyyyyyyy.ne.jp
X-Original-To: zzzzzzz@yyyyyyyy.ne.jp
Delivered-To: zzzzzzz@yyyyyyy.ne.jp
1002 — Date: Mon, 22 Sep 2008 09:25:37 +0900
1003 — From: user@xxxxxxxx.co.jp
1004 — To: zzzzzzz@ml.yyyyyyy.ne.jp
1005 — Subject: VISIT HOUR FOR TOMORROW AND TRANSMISSION OF MAP
1006 — Message-id: <20080922091043.37A4.user@xxxxxxxx.co.jp>
MIME-version: 1.0
1007 — Content-type: multipart/mixed; boundary=------_4799A550270C088A0538_MULTIPART_MIXED_
Content-transfer-encoding: 7bit
Sender: user@xxxxxxxx.co.jp
Reply-To: user@xxxxxxxx.co.jp

USER NAME:tanaka — 1201

NON-RECEIVING MAIL LIST SCREEN

- SENDER: suzuki@xxxx.jp — 1202
- TRANSMISSION DATE AND TIME: 08/09/30 13:03 — 1203
- DELIVERED (TO): takahashi@xxxxx.jp,watanabe@xxxxx.jp — 1204
- CC: tanaka@xxxxx.jp — 1205
- SUBJECT: VISIT HOUR FOR TOMORROW AND TRANSMISSION OF MAP — 1206

NOTE — 1207

VISIT HOUR TO OUR COMPANY FOR TOMORROW AND MAP TO OUR COMPANY ARE MAILED AS FOLLOWS
xxxxxxxxxxxxxxxxxxxxxxxxxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxxxxxxxxxxxxxxxxx
xxxxxxxxxxxxxxxxxxxx ATTACHMENT FILE: PRESENT — 1208
FILE NAME AND SIZE: xxxxxxx.doc/80kb
xxxxxxx.gif/128kb

LOGOUT — 1209

```
Jan 1 01:20:25 mailserver1 qmail-send: 1222820425.344xxx new msg 2670594
Jan 1 01:20:25 mailserver1 qmail-send: 1222820425.344xxx info msg 2670594: bytes 162800 from <suzuki@xxxxx.jp> qp 14310 uid 82
Jan 1 01:20:25 mailserver1 qmail-send: 1222820425.344xxx starting delivery 40715: msg 2670594 to local inoue@yyyyy.jp
Jan 1 01:20:25 mailserver1 qmail-send: 1222820425.344xxx delivery 40715: failure: There is not sufficient disk space in the destination mail box.//
Jan 1 01:20:25 mailserver1 qmail-send: 1222820425.344xxx end msg 2670594
```

SYSTEM FOR NOTIFYING MAIL-RECEIVING ERROR INFORMATION

BACKGROUND OF THE INVENTION

1. Field of the Invention

The present invention relates to extraction and notice of information for notifying a mail addressee of a mail receiving error due to a capacity limit of a mail server at the time of receiving the mail.

2. Description of the Related Art

The related art of the present invention will be explained with reference to documents.

In the midst where importance on electronic mail (simply called e-mail or mail) is increasing in companies, particularly in business performance requiring immediacy, there is an increasing need of instantly receiving the mail. However, it is general that in an Internet service provider (ISP) for providing mail services, the limit is set to a capacity of a mail box for protection of a server or a contract (capacity) thereof. Therefore, there are some cases where a need of the instant reception of the mail can not be achieved, for example, the mail can not be received for the reason that the capacity of the mail box exceeds a limit value.

Examples of technologies for overcoming this situation include a method of providing another receiver (mail box) not to interrupt reception of the mail itself or a method of processing receiving mail to cut down on a capacity of the mail itself (data capacity), thus continuing to receive the mail (for example, refer to Japanese Patent Laid-Open No. H02-213252 (1990)). Further, there is a method where at the time of POP receiving, it is determined whether or not a capacity per one piece of mail exceeds a limit value, and in a case of the exceeding, only a header thereof is received, which will be notified to an addressee of the mail to avoid a reception failure of the mail (for example, refer to Japanese Patent Laid-Open No. 2001-154946). According to this method, when the remaining mail data other than the header are within a capacity allowance range of the mail box thereafter, the remaining mail data are additionally received, which will be connected to the already received header portion, thereby enabling the entire mail to be received.

Further, there is a case where, when the capacity excess occurs in a mail service, sender's address information, message ID, mail capacity and transmission date and time are extracted from a server error log (refer to FIG. 13), and the error notice mail (warning mail) is notified to a delivered mail address for each capacity excess occurrence.

Theses methods, however, have the following problems. First, in the method disclosed in Japanese Patent Laid-Open No. H02-213252 (1990), a capacity other than the contract is simply used to receive mail of a customer as it is, raising a problem that wasteful consumption of a server resource occurs. Further, this method has a problem that it is necessary to take into account twice maintainability of customer data (that is, regarding two regions of the contract capacity and capacity other than the contract).

In addition, the method disclosed in Japanese Patent Laid-Open No. 2001-154946 is a method of solving capacity lack of a reception client at the time of POP receiving by mailer software. Therefore, this method does not yet solve problems with an information notice for an addressee at the capacity lack of the reception mail box in the mail server occurring at receiving processing between mail servers, and capacity maintenance as an ISP.

Further, since, in the technology of notifying a delivered mail address of information extracted from the server log as error notice mail, the information extraction is made from the log processed in the mail server, the information to be obtained is limited to header information of the mail. Therefore, information such as a subject of the mail of the receiving error or an address of a sender can be obtained, but it is impossible at all to know the body content of the mail of the receiving error. In addition, it is also impossible to know whether or not an attachment file exists in the mail of the receiving error or what kind of an attachment file it is. In addition, in a state where the mail box of the receiver has no vacant capacity, each time new mail is sent, the error notice mail is supposed to be sent. Therefore, this method is inconvenient for a receiver.

SUMMARY OF THE INVENTION

A mail receiving server according to the present invention comprises a mail receiving unit configured to execute receiving processing of mail, a first mail box for storing the received mail, a determining unit configured to determine at the time of receiving the mail by the mail receiving unit whether or not a vacant capacity capable of storing the received mail exists in the first mail box corresponding to a mail address described in a delivered destination of the received mail, a storage space for storing the mail as receiving error mail when it is determined that the first mail box has no storable vacant capacity by the determining unit, an extracting unit configured to extract header information and body information from the receiving error mail stored in the storage space, an information notice mail managing unit configured to generate information notice mail for notifying information regarding the receiving error mail to the mail address described in the delivered destination of the receiving error mail by using the header information and the body information extracted by the extracting unit, and a second mail box for storing the information notice mail generated by the information notice mail managing unit.

According to the present invention, at the time of a given capacity excess in the mail server, a reception rejecting function of the mail server can be used to limit the mail reception exceeding the capacity of the mail server, and at the same time, existence of the receiving error mail by the limit and the detail information can be quickly notified to a delivered mail address (addressee).

Particularly, the present invention is configured in such a manner as to store in the temporal storage space the mail which can not be stored due to the capacity excess, whereby the information in regard to the body of the mail and the attachment file can be extracted to notify the extracted mail as the detail information. Further, the present invention adopts the technology in which the receiving error notice mail box is provided in addition to the mailbox a capacity of which is defined by the contract with the customer (as an object of reception rejection), as the processing of the mail server in regard to the above notice to choose and use one or both of the mail boxes as needed. By thus adopting the different mail box and arranging the mail for the receiving error notice therein, the notice to the addressee can be more quickly performed by a so-called POP reception as a standard mail-receiving method.

Further, it is possible to remove the waste of the resource on the server by quickly deleting the information notice mail in the mail box.

Further features of the present invention will become apparent from the following description of exemplary embodiments (with reference to the attached drawings).

BRIEF DESCRIPTION OF THE DRAWINGS

FIG. 10 is a diagram showing an example of a general mail header;

FIG. 12 is a diagram showing an example of an information notice Web screen (individual); and FIG. 13 is a diagram showing an example of an error log of the conventional mail receiving server.

DESCRIPTION OF THE EMBODIMENTS

Hereinafter, embodiments of the present invention will be in detail explained with reference to the drawings.

Figure 1:
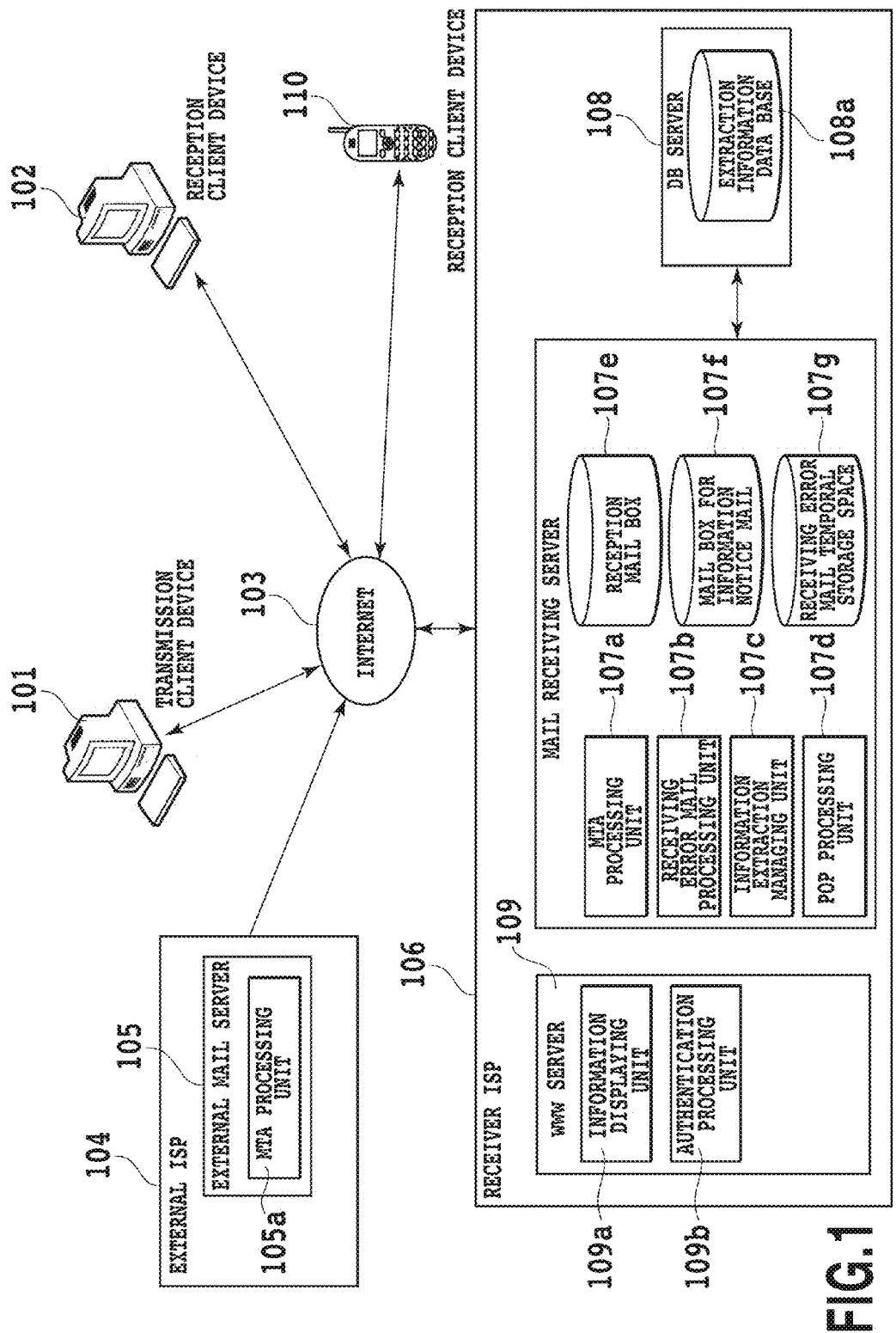
FIG. 1 is a construction diagram showing an electronic mail system according to an embodiment in the present invention.

FIG. 1 is a construction diagram showing an electronic mail system according to an embodiment in the present invention. In this figure, reference numerical 101 denotes a transmission client device which is a computer connected through the Internet 103. The transmission client device 101 is provided with mail software for sending mail to a receiver.

Reference numerical 102 denotes a reception client device which is a computer connected through the Internet 103. The reception client device 102 is provided with mail software for executing the processing (POP (Post Office Protocol) reception as a representative example) of mail reception to a mail server device at mail receiving. Reference numerical 110 also denotes an example of a reception client device and is a device such as a mobile phone equipped with a Web browser for a mobile device of an i-mode (registered trademark) or the like.

Reference numerical 103 denotes the Internet serving as a network mutually connecting client PCs, servers and the like.

Reference numerical 104 denotes an external ISP which is equipped with an external mail server 105 for sending mail from the transmission client device to an outside.

The external mail server 105 is a server for executing mail-sending processing by communicating with a mail receiving server 107 in a receiver ISP 106 when a sender sends mail to an addressee of the mail. The external mail server 105 is provided with a MTA (Mail Transfer Agent) processing unit 105a for performing transmission and reception of mail. Here, "addressee" means natural person or legal entity which is supposed to be a receiver of mail described in the column in "TO", "CC", or "BCC". It should be noted that, in a case where not a name of the natural person, but a mail address itself is described in the column of "TO", "CC", or "BCC", it will mean an underlining natural person or the like possessing (using) the corresponding mail address.

Reference numerical 106 denotes a receiver ISP which is provided with the mail receiving server 107 for receiving and managing mail delivered to the reception client device 102/110 and is further provided with a DB server 108 and a WWW server 109.

The mail receiving server 107 executes the processing of receiving mail from a MX (Mail Exchange) server (not shown) for receiving the mail from the external mail server 105, and storing the received mail in a delivered destination mail box. The mail receiving server 107 is provided with a MTA processing unit 107a for receiving the mail from the MX server. Further, the mail receiving server 107 is provided with a reception mail box 107e (first mail box) corresponding to each delivered destination mail address as a storage destination directory of the receiving mail and a mail box 107f (second mail box) for information notice mail. Here, "information notice mail" denotes mail for notifying a mail address (addressee) described as a delivered destination of the mail of information in regard to the mail which can not be stored in the reception mail box 107e (called "receiving error mail" in the present specification). Further, the mail receiving server 107 is provided with a receiving error mail processing unit 107b, an information extraction managing unit 107c, a POP processing unit 107d, and a receiving error mail temporal storage space 107g.

The MTA processing unit 107a is configured to execute the processing of receiving the mail from the MX server and storing the mail in the reception mail box 107e after checking the capacity thereof. In addition, when the mail can not be stored in the reception mail box 107e due to the capacity excess, the MTA processing unit 107a is configured to execute the processing of storing the corresponding mail in the receiving error temporal storage space 107g.

When the receiving error of the mail occurs due to the capacity excess of the mail box 107e, the receiving error mail processing unit 107b manages all of the receiving error mail processing such as information extraction from the mail or notice for a mail addressee. That is, the receiving error mail processing unit 107b is configured to execute general information notice mail management, such as the processing of calling the information extraction managing unit 107c, extracting information from the receiving error mail stored in the temporal storage space, generating information notice mail based upon the extracted information and storing the information notice mail in the mail box for the information notice mail.

The information extraction managing unit 107c is configured to execute each processing of extracting information from the receiving error mail stored in the receiving error mail temporal storage space 107g, storing the extracted information in the DB (Data base) server 108, deleting the information stored in the DB server 108, and the like.

The POP processing unit 107d is configured to execute the processing transferring data from the mail boxes 107e and 107f in response to a POP receiving processing request from the mail software of the reception client device 102/110.

The reception mail box 107e is a region for storing the received mail and all of the mail received through the MX server is stored herein for each mail address as long as it is not in a state of the capacity excess. The reception mail box 107e has a capacity upper limit value and can limit the receiving processing of the mail exceeding the upper limit value in cooperation with the MTA processing unit 107a. If the reception mail box 107e stores the capacity exceeding this upper limit value therein, it is in a state of the capacity excess.

The mail box 107f for the information notice mail is provided with a directory region for storing information notice mail generated when the mail can not be stored in the reception mail box 107e due to the mail receiving limit by the capacity excess, for each mail address. Upon having access to the mail boxes from the mail software, the mail data stored in both of the reception mail box 107e and the mail box 107f for the information notice mail are sent to the mail software in the reception client device 102/110. That is, when the reception client device 102/110 performs a receiving operation once, the mail data in regard to the mail address (user ID) are obtained from both of the reception mail box 107e and the mail box 107f for the information notice mail. It should be noted that the mail box 107f for the information notice mail is in a directory region which can not be objects for capacity check by the MTA processing unit 107a and the receiving limit of the mail based upon the capacity check result.

The receiving error mail temporal storage space 107g is provided with a directory region for temporarily storing the mail (header, body and all of attachment files) which can not be received due to the excess of the capacity limit for information extraction.

The DB server 108 is provided with data base software and stores mail information records and the extracted mail information therein. In addition, the DB data base 108 is also provided with an extraction information data base 108a.

The extraction information data base 108a is a special data base for storing mail information extracted by the information extraction managing unit 107c.

A WWW (World Wide Web) server 109 has a Web server program displaying information on a Web screen and is provided with an information displaying unit 109a and an authentication processing unit 109b. In response to access to the WWW server 109 from the reception client device 102/110, the WWW server 109 generates a Web screen from the requested information and displays the Web screen via a WWW browser on a display unit with which the reception client device 102/110 is provided.

The information displaying unit 109a is configured to retrieve receiving error mail extraction information from the extraction information data base 108a in response to a request from the reception client device, and generate an information notice Web screen displaying a receiving situation in a case where the receiving error mail extraction information exists. Here, "information notice Web screen" means a screen for notifying an addressee user of the mail of information in regard to the mail which can not be stored in the reception mail box 107e.

The authentication processing unit 109b is configured to execute authentication processing of the reception client device 102/110 having access to the WWW server 109. When the WWW server 109 is accessed from the reception client device 102/110, the authentication processing unit 109b is configured to transfer an input screen of the ID and the password. In a case where the ID and the password input from the reception client device 102/110 are correct, the WWW server 109 displays page information of the accessed URL. In a case where the ID and the password input from the reception client device 102/110 are wrong, the WWW server 109 displays an authentication error screen.

First Embodiment

Hereinafter, a first embodiment in the present invention will be in detail described.

Figure 2:
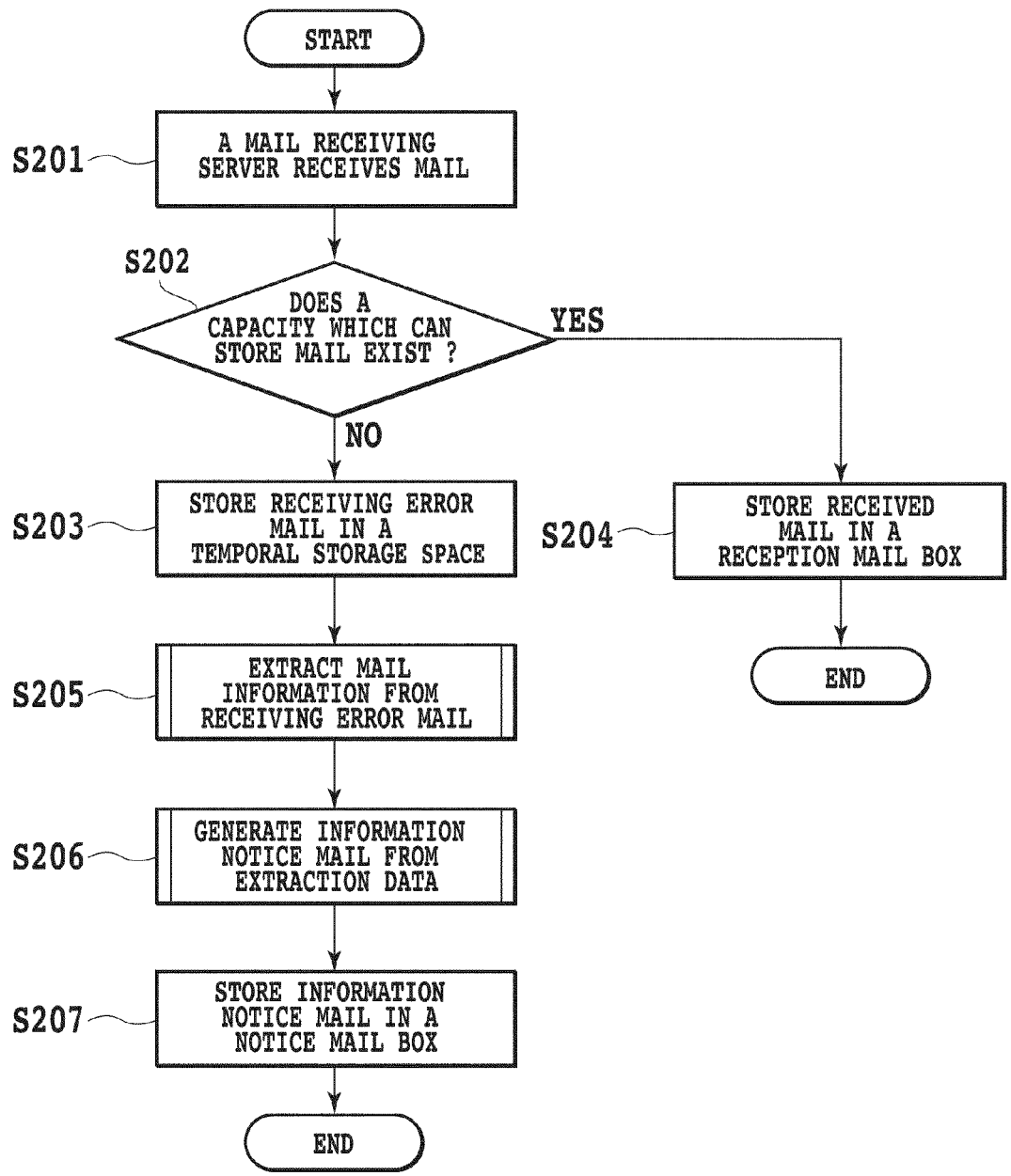
FIG. 2 is a flow chart showing an outline of the processing procedure according to a first embodiment in the present invention.

FIG. 2 is a flow chart showing an outline of the processing procedure according to the first embodiment in the present invention. It should be noted that S201 to S207 show each step.

First, at S201, the MTA processing unit 107a in the mail receiving server 107 is configured to receive mail sent from the transmission client device 101 from the external mail server 105 such as the external ISP 104 via the Internet 103.

Next, at S202, the MTS processing unit 107a is configured to confirm an addressee of the received mail and perform comparison check between a contract capacity of the reception mail box 107e for the addressee user and the stored data capacity in the reception mail box 107e for the addressee user at the present point. It should be noted that, in a case of plural addressees of the mail, the comparison check is performed for each addressee and the following processing is executed per the mail address unit. The vacant capacity of the reception mail box 107e of the addressee user is calculated with this comparison check, and it is determined whether or not the reception mail box 107e still has a capacity which can store the mail received at this time, based upon the comparison between the calculated vacant capacity and the data capacity of the received mail. As a result of the determination, in a case where the capacity which can store the mail received at this time exists in the reception mail box 107e, the processing of S204 is executed. At S204, the MTA processing unit 107a is configured to store the received mail in the reception mail box 107e of the addressee user therein to end the processing.

On the other hand, at S202 when it is determined that the capacity which can store the mail received at this time does not exist in the reception mail box 107e, the MTA processing unit 107a is configured to store the mail received at this time in the receiving error mail temporal storage space 107g. After this storage processing is completed, the MTA processing unit 107a is configured to notify the receiving error mail processing unit 107b that the storage processing is completed.

At S205, the receiving error mail processing unit 107b is configured to extract information for information notice mail notified to an addressee of the mail from the mail stored in the receiving error mail temporal storage space 107g, when the completion of the storage processing is notified at S203.

Here, a detail of the information extraction processing will be explained with reference to FIG. 4.

(Information Extraction Processing)

Figure 4:
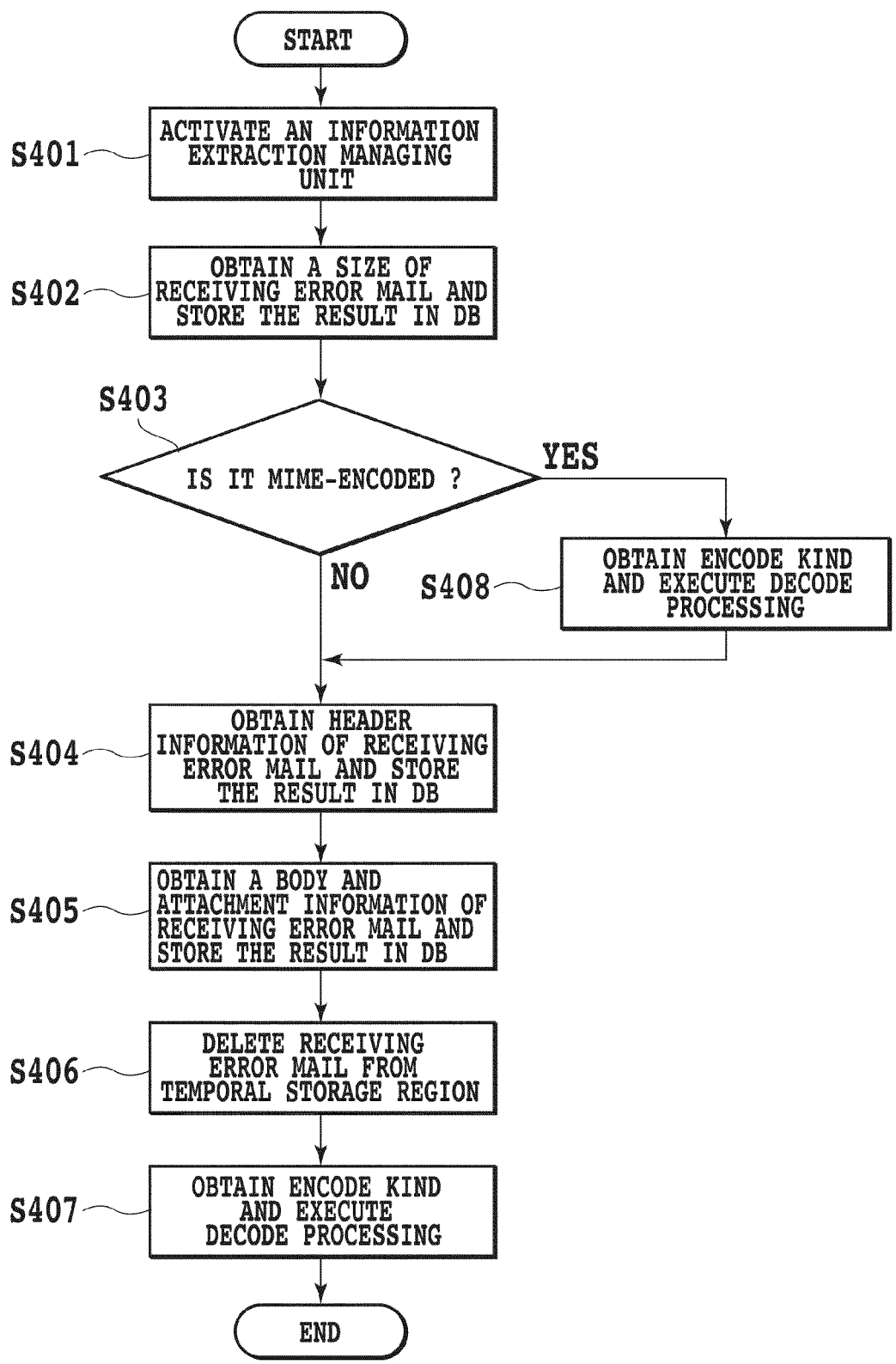
FIG. 4 is a flow chart showing a detail of information extraction processing.

FIG. 4 is a flow chart showing a detail of the information extraction processing, and S401 to S408 show each step.

First, at S401 the receiving error mail processing unit 107b is configured to call and activate the information extraction managing unit 107c.

At S402 the information extraction managing unit 107c is configured to obtain a data size of the mail stored in the receiving error mail temporal storage space 107g and store a value of the obtained data size in the DB server 108. After the storing, the process goes to S403, wherein the processing of obtaining the header information of the mail is executed.

At S403 the information extraction managing unit 107c is first configured to determine whether or not MIME (Multipurpose Internet Mail Extension) encoding processing is executed to the mail, from encode information of the header. In a case where it is determined that MIME encoding processing is not executed, the processing of S404 is executed as it is. In a case where it is determined that MIME encoding processing is executed, the content of the MIME encode is obtained, and the processing of S408 is executed.

At S408 the information extraction managing unit 107c is configured to recognize a decode specification from the content of the MIME encode obtained at S403 and execute the MIME decoding processing based upon the recognized decode specification to retain the information obtained by the decoding on a memory. When it is completed to retain this information, the process goes to the processing of next S404.

At S404 the information extraction managing unit 107c is configured to execute information extraction processing to all pieces of the information contained in the header of the mail. FIG. 10 shows an example of a general mail header. Reference numerical 1001 denotes a return-path and shows a return destination in a case where the mail reception can not be made normally or the like. Reference numerical 1002 denotes time, date, month, and year of transmission of the mail. Reference numerical 1003 denotes a mail address of a sender of the mail. Reference numerical 1004 denotes a mail address of an addressee described in a delivered destination (TO) of the mail. Reference numerical 1005 denotes a subject of the mail. Reference numerical 1006 denotes a unique identification number to which the mail software is allotted for executing transfer processing of the mail. Reference numerical 1007 denotes encode information expressing a MIME encoding state of the mail.

The information for extraction at this stage contains a message ID, a mail address of a sender, a name or delivered destination mail address of an addressee (TO, CC, and BCC), time and date for transmission, time and date for reception, a subject, a flag showing an importance level of mail, and the like. Common names are used as item names of the header based upon the contract, and since the display order of the respective items differs depending on a mail server on a route for the sending, the extraction is performed according to the following procedure.

First, all character lines contained in the header are parsed and the parsed text data are retained on a memory. The retrieval processing is executed to the parsed text data by using an item name of an extraction object as a key. Since each item of the header and the content data are described to be connected through the item name and ":" (colon), the item name hit by the retrieval processing and the character line connected by ":" are defined as the header content, which is obtained as header information of each item. The obtained header information is stored in the corresponding item name region (not shown) on the DB server 108 at each retrieval processing time, which continues to be performed until the retrieval of all the object items is completed. However, the header item not to be described depending on the mail server used by the sender exists, and therefore, in regard to the item which does not correspond to the retrieval, a blank value thereof is stored in the corresponding item name region on the DB server 108.

When the extraction processing for all pieces of the header information is completed, the process goes to S405 wherein the processing of extracting data of the mail body and the attachment file is executed.

At S405, the information extraction managing unit 107c is configured to extract the content of the mail body, presence/absence of the attachment file of the mail, the data size of the attachment file and the attachment file name. The extracted data are stored in each item region on the DB server 108. In regard to the content of the mail body, only the data corresponding to any size (character number) predefined are extracted from the head of the mail body, and the subsequent data exceeding the defined size are designed not to be extracted. In addition, an extraction size limit may be provided also to each of the items other than the above not to extract the data more than the extraction size limit. This can restrict consumption of the resource. The information extraction managing unit 107c is configured to store the extracted data in the corresponding item name region on the DB server 108 at each extraction time. The DB server 108 uses the message ID among the obtained information as a key item to manage these pieces of the information.

At S406 the information extraction managing unit 107c is configured to delete the receiving error mail temporarily stored for the information extraction from the receiving error mail temporal storage space 107g.

At S407 the information extraction managing unit 107c is configured to notify the receiving error mail processing unit 107b that the information extraction processing for all the items is completed, thus ending the information extraction processing.

The above explanation relates to the information extraction processing at S205 in FIG. 2. Followed by it, the processing of S206 for generating information notice mail will be explained.

At S206 the receiving error mail processing unit 107b is configured to generate the information notice mail based upon the receiving error extraction information stored in the DB server 108 at S205. A detail of the processing in regard to the generation of this information notice mail will be explained with reference to FIG. 5.

(Processing for Generating Information Notice Mail)

Figure 5:
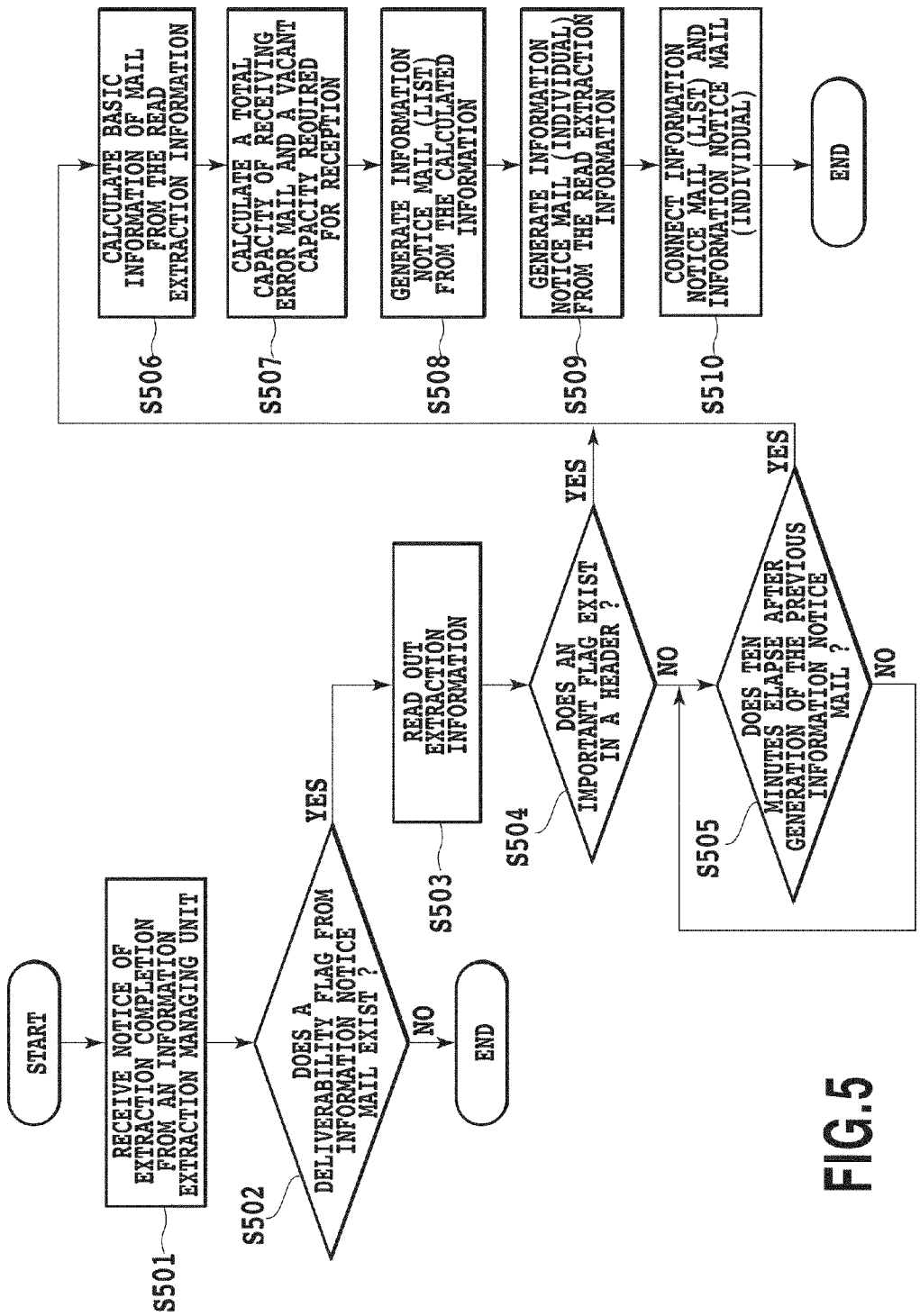
FIG. 5 is a flow chart showing a detail of the processing for generating information notice mail.

FIG. 5 is a flow chart showing a detail of the processing for generating the information notice mail. It should be noted that S501 to S510 show each step.

First, at S501 the receiving error mail processing unit 107b is configured to receive a notice of information extraction completion from the information extraction managing unit 107c.

At S502 the receiving error mail processing unit 107b is configured to check presence/absence of the receiving error mail extraction information in which deliverability of the information notice mail is not made yet. Specially the receiving error mail processing unit 107b is first configured to confirm a status field of the information notice mail deliverability in the mail information record stored in the DB server 108. In addition, it is checked whether or not a deliverability flag showing a state where the information notice mail is deliverable for the delivered destination mail address is set. In an event where the deliverability flag is not set, this event means that the receiving error mail extraction information in which the information notice mail is not yet generated exists. In this case, the process goes to the processing of S503 for generating the information notice mail. On the other hand, in an event where the deliverability flag is set, the information notice mail generating processing ends. It should be noted that the processing of setting the deliverability flag will be described later.

At S503 the receiving error mail processing unit 0107b is configured to read all of the extraction information (basic information in the header, detail information of the mail body and the like) in regard to the receiving error mail in which deliverability of the information notice mail is not yet completed out of the DB server 108. The read extraction information is retained in a memory (not shown) for the subsequent processing. It should be noted that, in a case where plural pieces of the receiving error mail in which the information notice mail is not yet generated exist, the above reading-out of the extraction information is performed in regard to all of them.

Next, at S504 the receiving error mail processing unit 107b is configured to determine whether or not a flag showing that the mail is important exists in the header of the receiving error mail as a processing object. In a case where the important flag (priority flag) exists, since the mail is considered to have high urgency, the process immediately goes to S506 for generating the information notice mail. On the other hand, in a case where the important flag does not exist, since it is considered that the mail has the low urgency and the necessity of quickly notifying the existence of the mail which has not been received to an addressee is low, the process goes to S505, wherein after an elapse of a predetermined time, the processing of generating the information notice mail is executed.

At S505 the receiving error mail processing unit 107b is configured to determine whether or not a predetermined time elapses after the previous generation of the information notice mail is carried out. Here, the predetermined time can be arbitrarily set in response to a user's favor and it is set as ten minutes in the present embodiment. When it is determined that more than ten minutes has elapsed, the process goes to S506. On the other hand, when it is determined that ten minutes has not elapsed, the processing of S505 is again executed, and this determination processing is repeated until the elapse of ten minutes is confirmed.

At S506 the receiving error mail processing unit 107b is configured to obtain header information in regard to the receiving error mail among the extraction information stored on a memory. Here, the header information contains a subject, a sender, time and date for reception, a mail size and the like.

At S507, first the receiving error mail processing unit 107b is configured to calculate a total data size of all the receiving error mail from the extraction information (header information, body information and attachment file information) stored on the memory. Next, there is calculated a difference amount between the total calculated data size of the receiving error mail and a remaining capacity of the reception mail box 107e at the present point in which it is determined at S202 that the storable capacity does not exist. A capacity value of the reception mail box 107e required for receiving all the receiving error mail is calculated from the calculation result.

Figure 8:
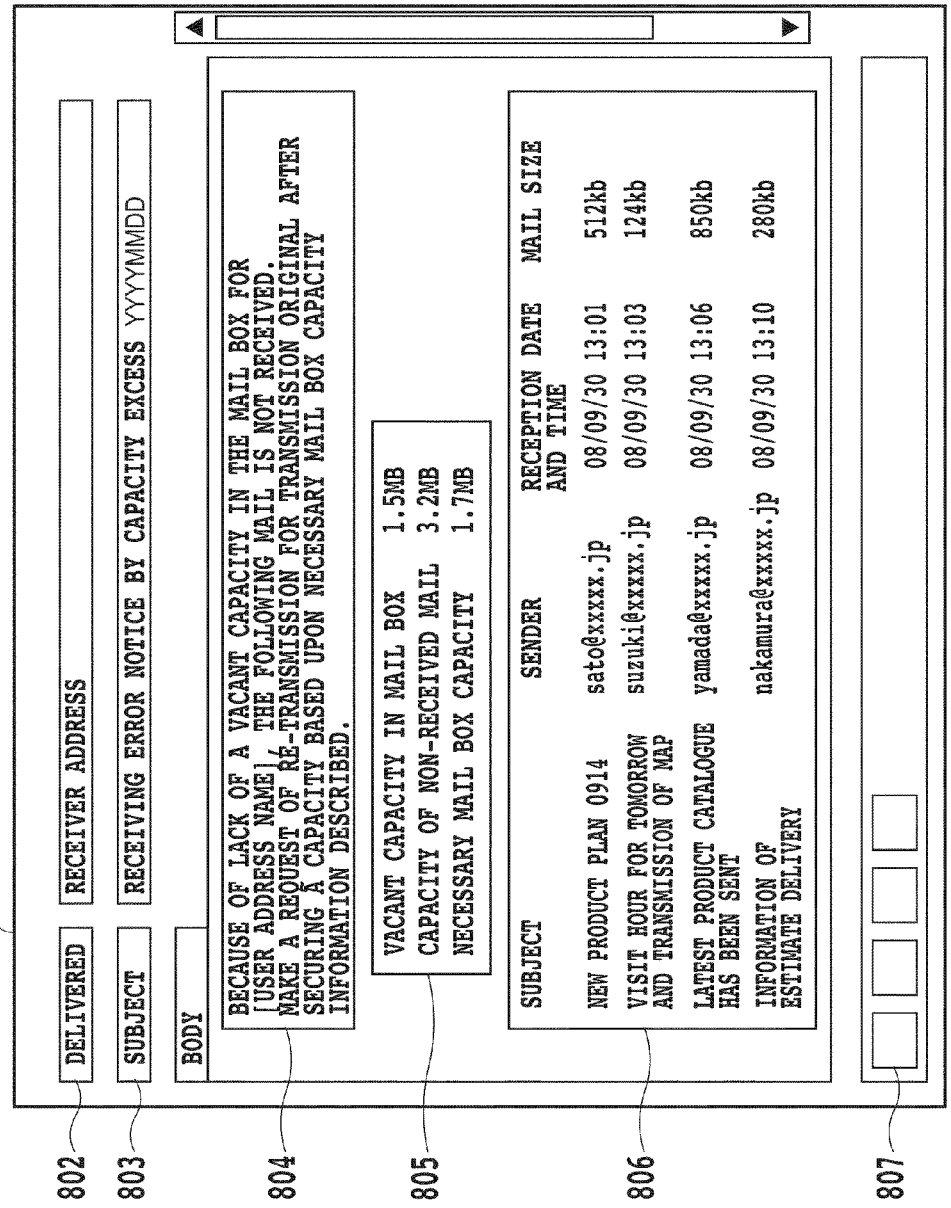
FIG. 8 is a diagram showing an example of the information notice mail (list)

At S508 the receiving error mail processing unit 107b is configured to generate information notice mail (list) as first information notice mail based upon the basic information in regard to each receiving error mail obtained at S506 and the total data size or the mail box capacity value calculated at S507. The information notice mail (list) enables recognition of the existence and the outline of the receiving error mail, such as all the subjects of the mail which has not been received and the data capacity required for receiving all the mail. The information notice mail (list) may be formed in the data format which can be browsed by mail software such as ".em1", and may be formed in any kind. FIG. 8 shows an example of the information notice mail (list). The information notice mail (list) 801 is constructed of a delivered destination 802, a subject 803, a body column of reference numerical 804 to 806 and icons of the information notice mail (individual) to be described later. In the delivered destination 802, a mail address causing the reception mail box 107e to be in the capacity excess or a name of an addressee user owning this mail address is described. The title of the information notice mail (list) is displayed in the subject 803. In the present embodiment, "receiving error notice due to capacity excess_YYYYMMDD" is displayed. It should be noted that "YYYMMDD" portion shows date, month and year. Reference numerical 804 denotes a body of the information notice mail (list) and describes therein words of the content for notifying that the receiving error has occurred due to the capacity limit excess of the receiving mail box 107e. Reference numerical 805 shows a vacant capacity of the reception mail box at the present point, a total capacity of the mail which has been not received, and a mail box capacity required for the reception. Reference numerical 806 denotes a list of an outline of the mail which has been in receiving error. In the present embodiment, a subject, a sender, time and date for reception, and a mail size are described. It should be noted that "subject" herein is a subject of the receiving error mail and is also a subject of the information notice mail (individual) to be described later. Reference numerical 807 denotes icons for the information notice mail (individual) applied in the attachment mail format. Since four pieces of the information notice mail (individual) exist in the present embodiment, four icons are displayed.

Subsequently, at S509 the information notice mail (individual) as second information notice mail is generated based upon information such as the header or the body read out at S503. The information notice mail (individual) to be generated at this stage allows comprehension of the detail for each mail which has not been received. Similarly to the information notice mail (list), for example, if the mail is formed in the data format which can be browsed by mail software such as ".em1", any kind of the mail may be used. In this way, in regard to the information in the body column of the receiving error mail, one file per one piece of mail is generated. The information such as a delivered destination or a subject of the information notice mail (individual) is preferably generated to be associated with the receiving error mail as a base as in the case of the present embodiment. That is, an address, transmission date and time, and a delivered destination mail address (TO, CC, and BCC), and a subject of a sender of the receiving error mail each are preferably described in each column of a sender, a delivered destination (TO and CC), transmission date and time, and a subject matter of the information notice mail (individual). This causes the basic information of the mail which has not been received to be communicated to an addressee with easy understanding and without a failure of the transmission.

Figure 9:
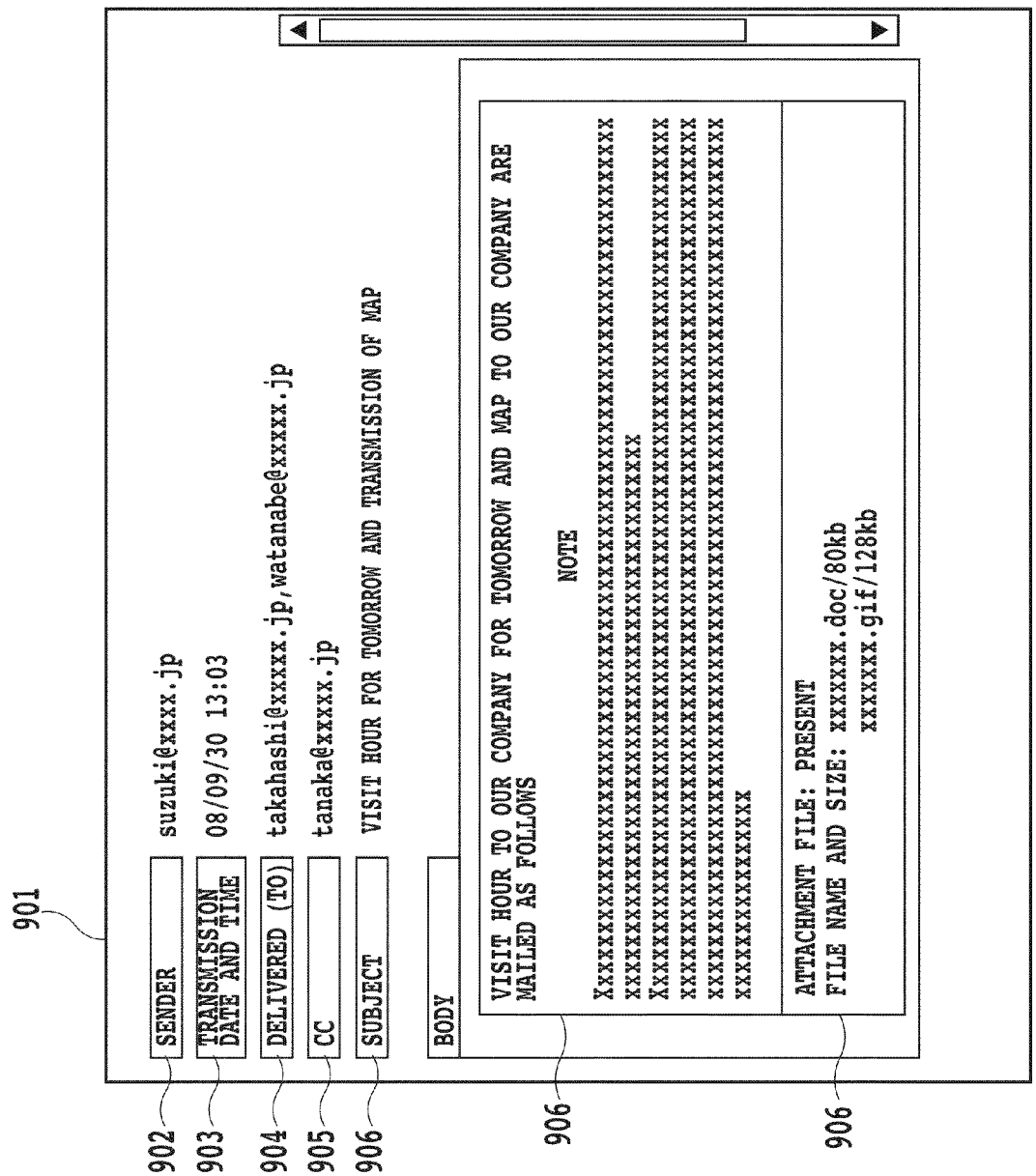
FIG. 9 is a diagram showing an example of the information notice mail (individual)

In addition, the column in the body of the information notice mail describes the content of the mail body as many as a given capacity (character number), presence/absence of an attachment file, a name of the attachment file, a data size of the attachment file and the like therein. Therefore, the detail information of the receiving error mail can be transmitted to an addressee with easy understanding and accuracy. FIG. 9 shows an example of the information notice mail (individual). Information notice mail 901 is composed of a sender 902, transmission date and time 903, a delivered destination (TO) 904, a CC 905, a subject 906 and a body column. The column in the sender 902 describes a mail address of a sender who has sent the receiving error mail or a name of the sender. In the present embodiment, the mail address of the sender is described. The column in the transmission date and time 903 describes therein transmission date and time of the receiving error mail. The column in the delivered destination (TO) 904 describes a name or a mail address of an addressee described in the delivered destination (TO) column of the receiving error mail. The column in the CC 905 describes a name a mail address of an addressee described in the CC column of the receiving error mail. It should be noted that in the present embodiment, a mail address of the addressee is displayed in each of the delivered destination (TO) 904 column and the CC 905 column instead of a name of the addressee. The column in the subject 906 describes therein a subject matter of the receiving error mail. The content of the body in the receiving error mail is described at reference numerical 907. However, the content is limited to the extent of a predetermined data size (character number). Information regarding an attachment file of the receiving error mail is described at reference numerical 908. That is, the information such as presence/absence of the attachment file, and a file name and a size of the attachment file is described therein. It should be noted that, since the attachment itself is deleted, the content of the file attached to the receiving error mail can not be confirmed even by the information notice mail (individual). However, since a file name containing an extension and a data size of the attachment file can be obtained, the content of the attachment file can be estimated on some degrees.

At S510 the receiving error mail processing unit 107b is configured to connect the information notice mail (list) and the information notice mail (individual) generated in S508 and S509 respectively. This connecting processing is processing of providing one or more pieces of the information notice mail (individual) concurrently generated with one piece of the information notice mail (list) as an attachment file, and is executed in the form of incorporating the information notice mail (individual) into the information notice mail (list). This incorporation may be made in the same method as the attachment mail such as MIME format.

As described above, the processing of generating the information notice mail at S206 in FIG. 2 is executed. When the generation of the information notice mail is performed at S206, the process goes to S207.

S207 is a step of storing the generated information notice mail in the mail box 107f for information notice mail. The receiving error mail processing unit 107b is configured to store the generated information notice mail in the information box 107f for the information notice mail of an addressee user. That is, the information notice mail is stored in a directory exclusive for the information notice mail which is in a region not contained in a total value of the use capacity of the reception mail box 107e of the addressee user. Therefore, data of the information notice mail can be stored in the mail box without addition to use of the contract capacity of the addressee user. Further, as described above, since the content described in the body of the information notice mail (individual) is limited to the predetermined data size, a large amount of the resources are not consumed. After the above storage processing is completed, the receiving error mail processing unit 107b is configured to set the deliverability flag to the information notice mail deliverability status field in the mail information record and store the mail information record in the DB server 108, thus ending the processing.

The addressee of the receiving error mail obtains the information notice mail generated as described above by the POP receiving processing of the mail software in the same way as the usual receiving mail browsing. In regard to the mail which the addressee is concerned about from the subject or the like as result of browsing the information notice mail (list), the attached information notice mail (individual) can be further browsed.

The receiving error mail processing unit 107b is configured to delete information notice mail at a point where the information notice mail is delivered to a given addressee. That is, at a point where the receiving error mail processing unit 107b receives a POP receiving processing request from the reception client device 102 or 110 and the information notice mail for the addressee is transferred from the mail box 107f for the information notice mail, the receiving error mail processing unit 107b is configured to quickly delete the information notice mail.

Figure 6:
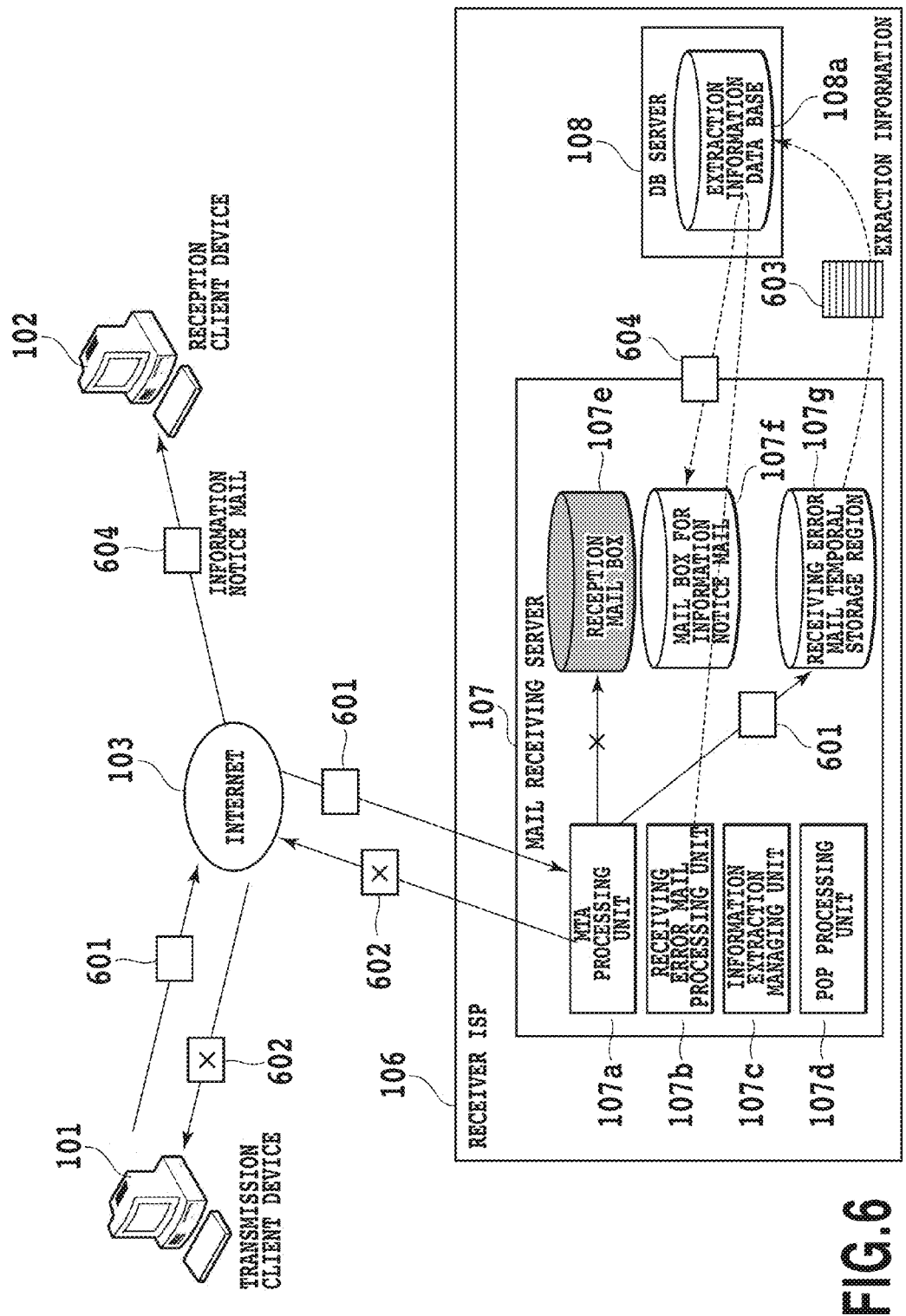
FIG. 6 is a schematic diagram visually showing how each processing in the first embodiment is executed.

FIG. 6 is a schematic diagram visually showing how each processing explained so far in the first embodiment is executed.

First, the transmission client device 101 sends mail 601 via the Internet 103. Then the MTA processing unit 107a in the mail receiving server 107 of a user who is an addressee of the mail tries to store the mail data in the reception mail box 107e of the addressee user. At this time, in a case where the reception mail box 107e can not store therein the mail data due to the capacity limit excess, the reception mail box 107e stores the mail 601 in the reception error mail temporal storage space 107g. The information extraction managing unit 107c is configured to extract necessary information 603 from the mail data temporarily stored and store the extracted necessary information 603 in the DB server 108. Since the mail 601 stored in the receiving error mail temporal storage space 107g is simply temporarily stored, after extraction of the necessary information is completed, the mail 601 is quickly deleted from the mail receiving server 107. The extracted information 603 is information desired by an addressee of the mail, such as transmission date and time, a sender, a subject, a delivered destination and the like. The receiving error mail processing unit 107b is configured to generate information notice mail 604 for an addressee based upon the extracted information 603 and store the generated information notice mail 604 in the mail box 107f for the information notice mail which is out of an object of capacity limit. An addressee user of the mail uses mail software in the reception client device 102 to POP-receive the information notice mail 604, thereby making it possible to recognize the fact that the mail from a sender can not be received and the detail information of the receiving error mail. Since the addressee user of the mail can browse the detail information of the receiving error mail (part of the body or the like), the addressee user can easily determine importance of the mail which can not be received. In consequence, the addressee user of the mail produces at least a vacancy of the mail which should be received, and thereafter, tends to easily make a request of re-transmission for a transmission original user (a sender) of the mail.

It should be noted that in a case where the reception mail box 107e can not store mail data due to capacity limit excess, the reception mail box 107e, after storing the mail 601 in the receiving error mail temporal storage space 107g, returns the transmission error mail 602 to the sender's mail address of the mail 601. The transmission error mail 602 describes therein an event that the reception mail box of the user who is an addressee of the mail can not store the mail data and the content of the mail. The user of the sender can obtain that the mail can not be sent by receiving the transmission error mail 602.

It should be noted that the information stored in the DB server 108 is managed by the information extraction managing unit 107c, and is retained for a period (for example, 19 days) in advance designated by a system manager after date and time of the receiving error occurrence. At a point where the designated period elapses after the date and time of the receiving error occurrence, the extraction information may be automatically deleted. In this case, the information extraction managing unit 107c is configured to automatically activate this check processing at the processing time in advance determined during one day to compare the information of the date and time of the receiving error occurrence of the extraction information retained in the DB server 108 with the information of the present date and time. When the compared information of the date and time exceeds the designated period (for example, 14 days: 336 hours), the receiving error mail processing unit 107b is configured to delete the corresponding extraction information. When the compared information of the date and time does not exceed the designated period, the check processing ends without executing the deletion processing.

As described above, the present embodiment is in detail explained, wherein the information notice mail is delivered to only the addressee owning the mail address in which the reception mail box 107e is in the capacity limit excess. However, the present invention is not limited thereto. That is, the present invention covers also a case where in an event that plural addressees of the mail exist and a part of the addressees can not receive the mail due to the capacity limit excess, the information notice mail is delivered also to the other addressee who has received the mail safely. That is, the present invention also covers, as an embodiment thereof, a case where watanabe@xxxxx. JP among the mail addresses described in the delivered destination 904 of the information notice mail (individual) shown in FIG. 9 has no problem with the capacity limit excess and is stored in the corresponding reception mail box 107e. In this case, the receiving error mail processing unit 107b is configured to generate the information notice mail for "takahashi@xxxxx.jp at S206, and simultaneously generate the information notice mail for "watanabe@xxxxx.jp. Here, the information notice mail generated for "watanabe@xxxxx.jp" is preferably limited to the mail where "watanabe@xxxxx.jp" is contained in the addressee. This is because the necessity of notifying one user of information regarding an event that the other user can not receive the mail which has no relation to the one user is low. By thus delivering the information notice mail also to the addressee who has safely received the mail, any addressee can obtain who has not received the mail among a group of the addressees of the mail. Therefore, the transmission failure of the important information can be certainly prevented.

Second Embodiment

In the first embodiment, the fact that the receiving error of the mail has occurred and the content thereof are notified to the addressee of the mail through the information notice mail. Here, there will be explained a second embodiment of notifying the addressee of these matters through display thereof on a Web screen instead of the information notice mail.

Figure 3:
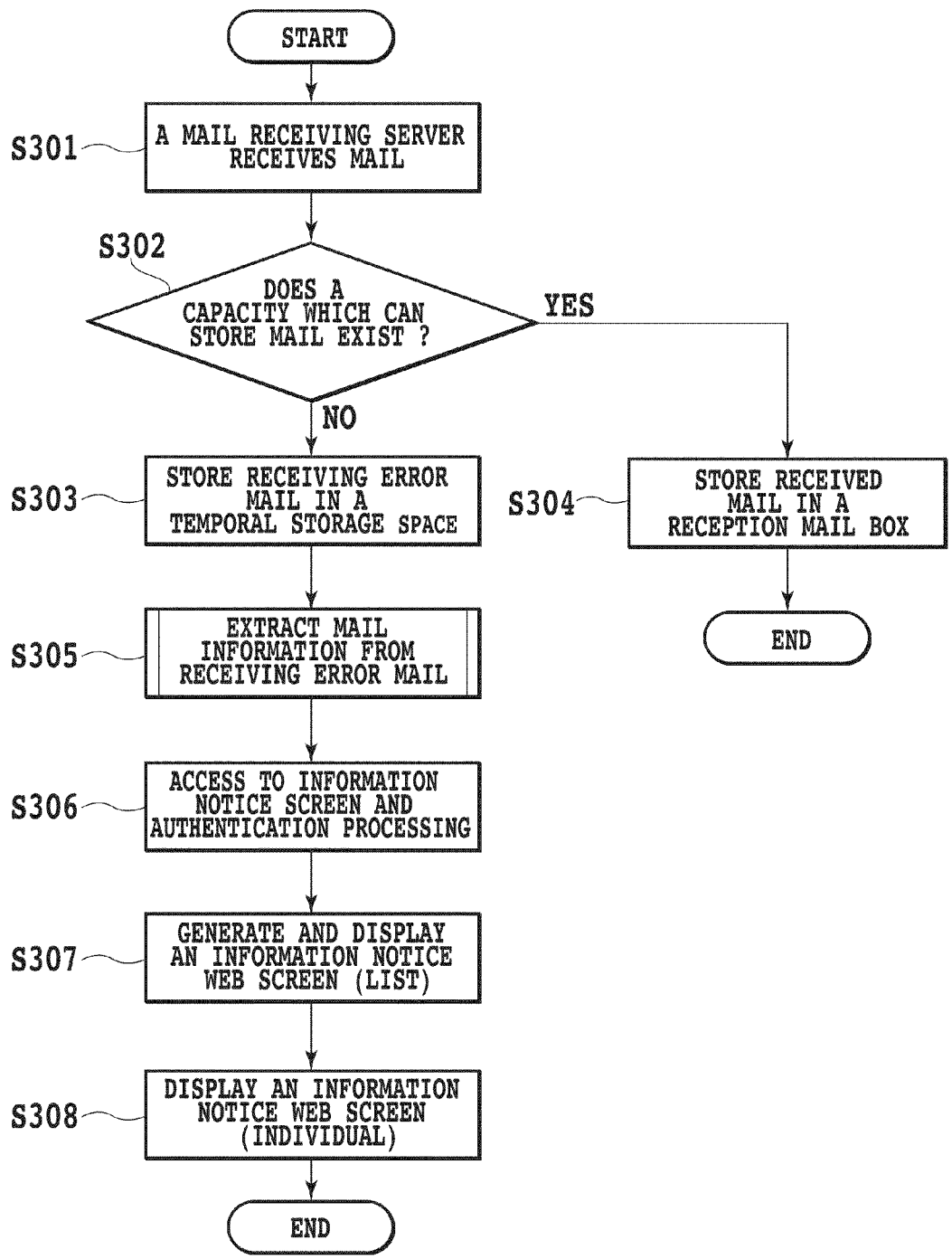
FIG. 3 is a flow chart showing an outline of the processing procedure according to a second embodiment in the present invention.

FIG. 3 is a flow chart showing the outline of the processing procedure according to the second embodiment in the present invention. It should be noted that S301 to S308 show each step. Since S301 to S305 are the same as S201 to S205 in FIG. 2, the explanation is omitted.

At S306 a user who is desired to confirm the receiving situation of the mail has access to a notice screen URS (not shown) of the WWW server 109 through the reception client device 102/110. Here, an example thereof includes a personal computer 102 and a mobile phone 110 mounting a browser thereon. Instead of the reception client device 102/110 shown in the figure, however, the other electronic information device accessible to the Internet 103, such as PDA may be adopted. The WWW server 109 includes the authentication processing unit 109b which is configured to execute the user authentication processing to the reception client device 102/110 which has had access thereto, When the user authentication processing is satisfied, the process goes to S307. When the user authentication processing is failed, the authentication processing unit 109b is configured to generate an error screen described in HTML (Hyper Text Markup Language) and transfer the generated HTML data for the reception client device 102/110 to end the processing.

After the user authentication processing is satisfied, at S307 the information displaying unit 109a is configured to retrieve presence/absence of receiving error mail extraction information in regard to the user in the DB server 108 based upon the user information (the corresponding mail address or the like) which has satisfied the user authentication.

In a case where the receiving error mail extraction information corresponding to the user exists, the information displaying unit 109a is configured to generate the information notice Web screen (list) 705 of the receiving error mail described in HTML and transfer the Web screen for the reception client device 102/110 through the Internet 103. In a case where the receiving error mail extraction information corresponding to the user does not exist, the information displaying unit 109a is configured to generate the information notice Web screen (list) 705 in regard to an event that there is no mail which has not been received and transfer the Web screen for the reception client device 102/110. The browser in the reception client device 102/110 receives the transferred HTML data, and displays the information notice Web screen (list) 705 on the browser screen.

Figure 11:
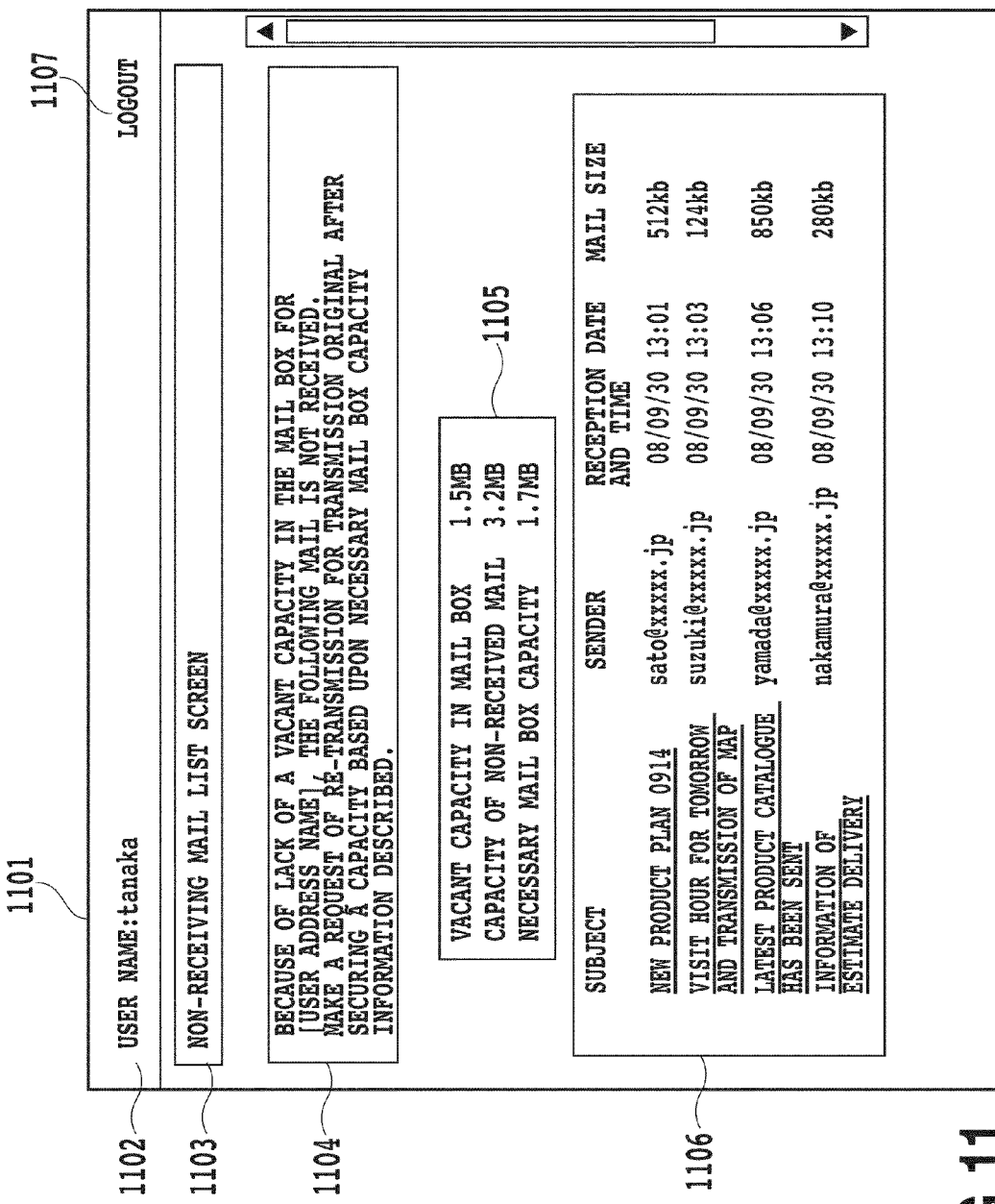
FIG. 11 is a diagram showing an example of an information notice Web screen (list)

FIG. 11 shows an example of the information notice Web screen (list). A login user name 1102 and a name of a screen 1103 are displayed on the top part of the information notice Web screen (list) 1101. Reference numerical 1104 denotes the body of the information notice Web screen (list), displaying words of the content notifying that the receiving error of the mail occurs due to the capacity limit excess of the mail box thereon. Reference numerical 1105 displays the information including a vacant capacity and a total capacity of the receiving error mail at the present point in the reception mail box 107e of the user, and a necessary mail box capacity required based upon a difference between the vacant capacity and the total capacity. Reference numerical 1106 denotes a list of the outline of the mail which is made to the receiving error. In the present embodiment, subjects, senders, transmission date and time, and mail sizes thereof are displayed. It should be noted that "subject" herein is a subject of the receiving error mail and also a subject of an information notice Web screen (individual) to be described later. The underline display means that another screen can be displayed. When either one of the subjects is clicked, the information notice Web screen (individual), which will be described later, corresponding to the clicked subject is displayed. Reference numerical 1107 denotes a logout button for changing the information notice Web screen from a login state of to an logout state.

At S308 there is executed the processing of displaying the information notice Web screen (individual) displaying the detail information of each receiving error mail. When either one of "the subjects" displayed by the underline at S307 is clicked, this processing is started. First, the information display unit 109a is configured to obtain extraction information of the specific receiving error mail designated in the information notice Web screen (list) from the DB server 108 and generate the information notice Web screen (individual) based upon the obtained extraction information. It should be noted that this information notice Web screen (individual) is also generated as data described in HTML in the same way as the information notice Web screen (list). The generated HTML data is transferred to the reception client device 102/110 through the Internet 103. The browser in the reception client device 102/110 receives the transferred HTML data, and displays the information notice Web screen (individual) on the browser screen.

FIG. 12 shows an example of the information notice Web screen (individual). Information notice Web screen 1201 (individual) is composed of a sender 1202, transmission date and time 1203, a delivered destination (TO) 1204, a CC 1205, a subject 1206, and body columns 1207 and 1208. In regard to the column in the sender 1202, a name of a sender who has sent the receiving error mail is displayed. In the present embodiment, a mail address of the sender is displayed instead of the name of the corresponding sender. In regard to the column in the transmission date and time 1203, transmission date and time of the receiving error mail is displayed. In regard to the column in the delivered destination (TO) 1204, a name or a mail address of an addressee described in the delivered destination (TO) column of the receiving error mail is displayed. In regard to the column in the CC 1205, a name or a mail address of an addressee described in the CC column of the receiving error mail is displayed. It should be noted that in the present embodiment, the mail address of the addressee is displayed in each of the destination (TO) 1204 column and the CC 1205 column instead of the name of the addressee. In regard to the column in the subject 1206, a subject of the receiving error mail is displayed. The content of the body in the receiving error mail is displayed at reference numerical 1207. However, the content is limited to the extent of a predetermined data size (character number). Information regarding an attachment file of the receiving error mail is displayed at reference numerical 1208. That is, the information such as presence/absence of the attachment file, and a file name and a size of the attachment file is displayed therein. It should be noted that, since the attachment itself is deleted, the content of the file attached to the receiving error mail can not be confirmed even by the information notice Web screen. However, since a file name containing an extension and a data size of the attached file can be obtained, the content of the attached file can be estimated on some degrees.

Figure 7:
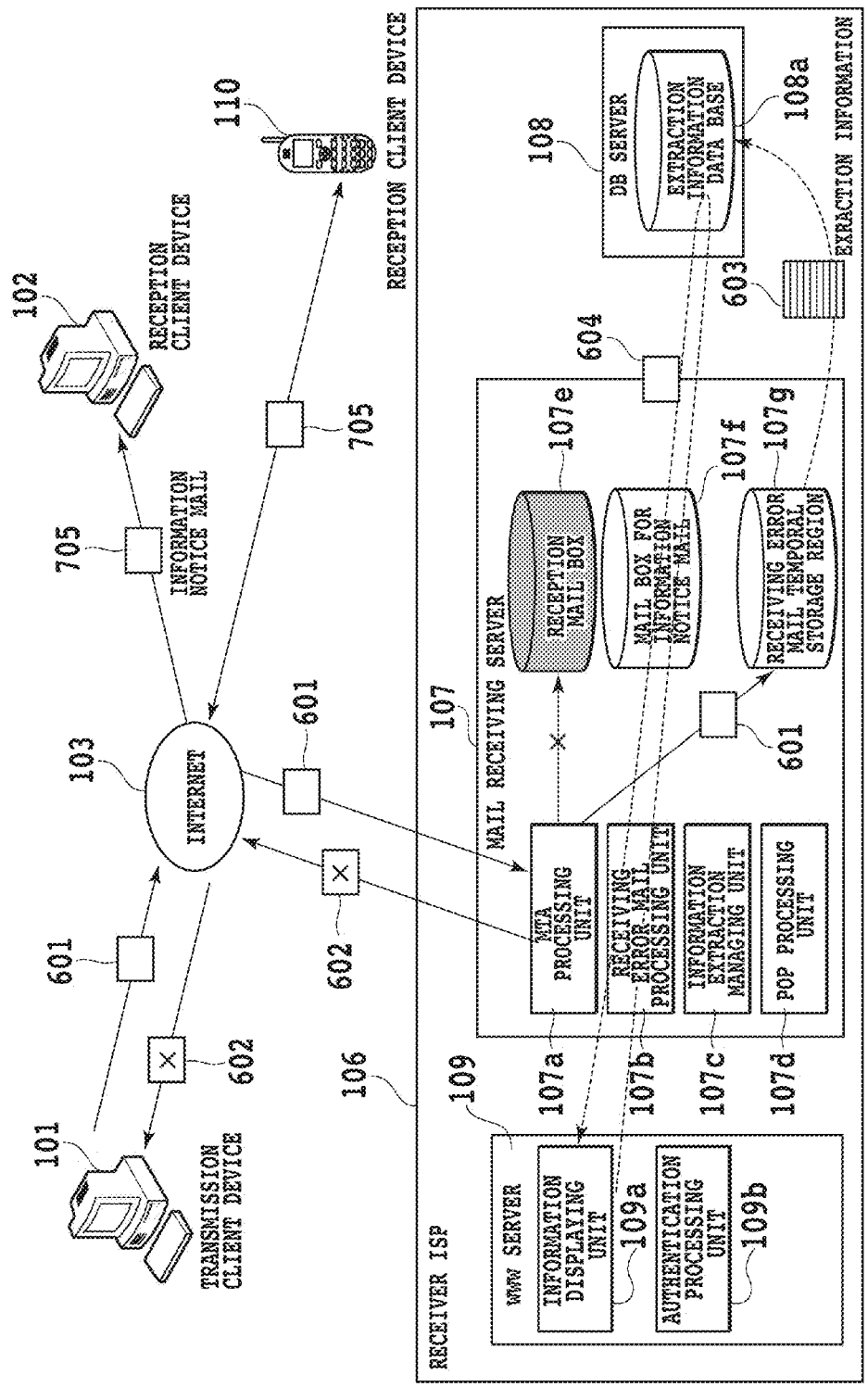
FIG. 7 is a schematic diagram visually showing how each processing in the second embodiment is executed.

FIG. 7 is a schematic diagram visually showing how each processing explained so far in the second embodiment is executed.

First, the transmission client device 101 sends mail 601 via the Internet 103. Then the MTA processing unit 107a in the mail receiving server 107 of a user who is an addressee of the mail tries to store the mail data in the reception mail box 107e of the addressee user. At this time, in a case where the reception mail box 107e can not store the mail data due to the capacity limit excess, the reception mail box 107e stores the mail 601 in the reception error mail temporal storage space 107g. The information extraction managing unit 107c is configured to extract necessary information 603 from the mail data temporarily stored and store the extracted necessary information 603 in the DB server 108. Since the mail 601 stored in the receiving error mail temporal storage space 107g is simply temporarily stored, after extraction of the necessary information is completed, the mail 601 is quickly deleted from the mail receiving server 107. The extracted information 603 is information which an addressee of the mail is desired to obtain, such as transmission date and time, a sender, a subject, a delivered destination and the like. The above-mentioned is the same as in FIG. 6. First, when the browser on the reception client device 102/110 has access to the information displaying unit 109a, the information displaying unit 109a is configured to generate HTML data 705 as the information notice Web screen based upon the stored information 603. In addition, the information displaying unit 109a is configured to transfer the generated HTML data 705 to the reception client device 102/110 through the Internet 103. In regard to the information displaying unit 109a, a well-known technology can be applied and also the information displaying unit 109a is not a technical matter specific to the present invention. Therefore, a detail explanation thereof is omitted. As a result, the addressee user can obtain the fact that the mail from the sender is not received and the detail information of the receiving error mail.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-059579, filed Mar. 12, 2009, which is hereby incorporated by reference herein in its entirety.

What is claimed is:

1. A mail receiving server comprising a processor and memory, cooperating to function as:
   a mail receiving unit configured to execute processing of receiving mail;
   a first mail box for storing the received mail;
   a determining unit configured to execute processing of checking, at the time of receiving the mail by the mail receiving unit, whether or not a vacant capacity capable of storing the received mail exists in the first mail box corresponding to a mail address described in a delivered destination of the received mail;
   a storage space for storing the mail as receiving error mail when it is checked that the first mail box has no storable vacant capacity by the determining unit;
   an extracting unit configured to execute processing of extracting header information and body information from a plurality of the receiving error mails stored in the storage space;
   an information notice mail managing unit configured to execute processing of generating information notice mail for notifying information regarding the receiving error mail to the mail address described in the delivered destination of the receiving error mail by using the header information and the body information of the receiving error mails extracted by the extracting unit,
   wherein the information notice mail includes a first information notice mail and a plurality of second information notice mails, the first information notice mail being generated based upon the header information of the plurality of the receiving error mails, and the second information notice mails being generated based upon the header information and the body information of each of the receiving error mails; and
   a second mail box for storing the information notice mail generated by the information notice mail managing unit.

2. A mail receiving server according to claim 1, wherein the information notice mail is generated by incorporating the second information notice mails into the first information notice mail as attachment files.

3. A mail receiving server according to claim 1, wherein the information notice mail managing unit is configured to execute processing of:
   calculating a total data size of all the receiving error mail from the header information and the body information extracted by the extracting unit;
   calculating a difference amount between the total calculated data size of all the receiving error mail and the remaining capacity of the first mail box at the present point which is determined as having no storable vacant capacity; and thereby calculating a capacity value of the first mail box required for receiving all the receiving error mail.

4. A mail receiving server according to claim 1, further comprising a POP processing unit configured to execute processing of transferring the mail stored in the first mail box or the second mail box in response to a request of POP receiving processing from a reception client device, wherein the information notice mail managing unit is configured to execute processing of deleting the transferred information notice mail, at the time the information notice mail is transferred by the POP processing unit.

5. A mail receiving server according to claim 1, wherein the extracting unit is configured to execute processing of extracting attachment file information from the receiving error mail stored in the storage space, and the information notice mail managing unit is configured to execute processing of generating the second information notice mail in such a manner as to contain at least one of information composed of presence/absence of an attachment file, a name of the attachment file, and a size of the attachment file.

6. A mail receiving server according to claim 1,
wherein the information notice managing unit is configured to execute processing of:
checking whether or not a flag showing that the mail is important mail is contained in the header information extracted by the extracting unit;
generating the information notice mail after an elapse of a predetermined time in a case where the flag showing that the mail is the important mail is not contained; and
generating the information notice mail before the elapse of the predetermined time in a case where the flag showing that the mail is important is contained.

7. A mail receiving server according to claim 1, wherein the information notice mail managing unit is configured not to execute processing of generating the information notice mail in regard to a mail address corresponding to the first mail box determined as having a storable vacant capacity by the determining unit among the mail addresses described in a delivered destination of the receiving error mail.

8. An electronic mail system in which a transmission client device for sending mail, a reception client device mounting a browser thereon for receiving the mail, a mail receiving server and a WWW server are connected through the Internet, the mail receiving server comprising a processor and memory, cooperating to function as:
a mail receiving unit configured to execute processing of receiving mail;
a first mail box for storing the received mail;
a determining unit configured to execute processing of checking, for each mail address at the time of receiving the mail by the mail receiving unit whether or not a vacant capacity capable of storing the received mail exists in the first mail box corresponding to a mail address described in a delivered destination of the received mail;
a storage space for storing the mail as receiving error mail when it is checked that the first mail box has no vacant capacity by the determining unit; and
an extracting unit configured to execute processing of extracting header information and body information from a plurality of the receiving error mails stored in the storage space,
an information notice mail managing unit configured to execute processing of generating information notice mail for notifying information regarding the receiving error mail to the mail address described in the delivered destination of the receiving error mail by using the header information and the body information of the receiving error mails extracted by the extracting unit,
wherein the information notice mail includes a first information notice mail and a plurality of second information notice mails, the first information notice mail being generated based upon the header information of the plurality of the receiving error mails, and the second information notice mails being generated based upon the header information and the body information of each of the receiving error mails; and
a second mail box for storing the information notice mail generated by the information notice mail managing unit,
wherein the WWW server comprises a unit configured to execute processing of:
generating HTML data as an information notice Web screen expressing information in regard to the receiving error mail based upon the header information and the body information by being accessed from the browser of the reception client device; and
transferring the generated HTML data to the reception client device, and
wherein the reception client device displays the information notice Web screen expressed by the transferred HTML data by the browser.

9. The electronic mail system according to claim 8, wherein the information notice mail includes:
first information notice mail generated based upon the header information; and
second information notice mail generated based upon the header information and the body information.

10. A method of managing mail in a mail receiving server comprising: a mail receiving unit configured to execute receiving processing of mail, a first mail box and a second mail box for storing the mail in accordance with each mail address, and a storage space for storing the mail which can not be stored in the first mail box, the method comprising the steps of:
determining at the time of receiving the mail by the mail receiving unit whether or not a vacant capacity capable of storing the received mail exists in the first mail box corresponding to a mail address described in a delivered destination of the received mail;
storing the mail as receiving error mail into the storage space when it is determined that the first mail box has no storable vacant capacity by the determining step;
extracting header information and body information from a plurality of the receiving error mails stored in the storage space by the storing step;
generating information notice mail for notifying information regarding the receiving error mail to the mail address described in the delivered destination of the receiving error mail by using the header information and the body information of the receiving error mails extracted by the extracting unit,
wherein the information notice mail includes a first information notice mail and a plurality of second information notice mails, the first information notice mail being generated based upon the header information of the plurality of the receiving error mails, and the second information notice mails being generated based upon the header information and the body information of each of the receiving error mails; and storing the information notice mail generated by the information notice mail managing step in the second mail box.

11. The method according to claim 10, wherein the information notice mail is generated by incorporating the second information notice mails into the first information notice mail as attachment files.

12. A method of managing mail in an electronic mail system in which a transmission client device for sending mail, a reception client device mounting a browser thereon for receiving the mail, a mail receiving server and a WWW server are connected through the Internet, the mail receiving server comprising a mail receiving unit configured to execute receiving processing of mail, a first mail box and a second mail box for storing the mail, and a storage space for storing the mail which can not be stored in the first mail box, the method comprising the steps of:
- determining at the time of receiving the mail by the mail receiving unit whether or not a vacant capacity capable of storing the received mail exists in the first mail box corresponding to a mail address described in a delivered destination of the received mail;
- storing the mail as a receiving error mail into the storage space when it is determined that the first mail box has no storable vacant capacity by the determining step;
- extracting header information and body information from a plurality of the receiving error mail stored in the storage space by the storing step;
- generating information notice mail for notifying information regarding the receiving error mail to the mail address described in the delivered destination of the receiving error mail by using the header information and the body information of the receiving error mails extracted by the extracting step,
- wherein the information notice mail includes a first information notice mail and a plurality of second information notice mails, the first information notice mail being generated based upon the header information of the plurality of the receiving error mails, and the second information notice mails being generated based upon the header information and the body information of each of the receiving error mails; and
- storing the information notice mail generated by the information notice mail managing step in the second mail box;
- the WWW server performing the steps of:
- generating HTML data as an information notice Web screen expressing information in regard to the receiving error mail based upon the header information and the body information by being accessed from the browser of the reception client device; and
- transferring the generated HTML data to the reception client device, and
- wherein the reception client device performs the step of:
- displaying the information notice Web screen expressed by the transferred HTML data by the browser.

13. The method according to claim 12, wherein the information notice mail is generated by incorporating the second information notice mails into the first information notice mail as attachment files.

14. A non-transitory computer-readable storage medium storing a computer program for carrying out by a computer a method of managing mail in a mail receiving server comprising a mail receiving unit configured to execute receiving processing of mail, a first mail box and a second mail box for storing the mail in accordance with each mail address, and a storage space for storing the mail which can not be stored in the first mail box, the method of managing the mail comprising:
- a step of determining at the time of receiving the mail by the mail receiving unit whether or not a vacant capacity capable of storing the received mail exists in the first mail box corresponding to a mail address described in a delivered destination of the received mail;
- a step of storing the mail as receiving error mail into the storage space when it is determined that the first mail box has no storable vacant capacity by the determining step;
- a step of extracting header information and body information from a plurality of the receiving error mails stored in the storage space by the storing step;
- an information notice mail managing step of generating processing of generating information notice mail for notifying information regarding the receiving error mail to the mail address described in the delivered destination of the receiving error mail by using the header information and the body information of the receiving error mails extracted by the extracting step,
- wherein the information notice mail includes a first information notice mail and a plurality of second information notice mails, the first information notice mail being generated based upon the header information of the plurality of the receiving error mails, and the second information notice mails being generated based upon the header information and the body information of each of the receiving error mails;
- a step of storing the information notice mail generated by the information notice mail managing step in the second mail box.

15. The non-transitory computer-readable storage medium according to claim 14, wherein the information notice mail is generated by incorporating the second information notice mails into the first information notice mail as attachment files.

* * * * *